(12) United States Patent
Shouji et al.

(10) Patent No.: US 6,179,478 B1
(45) Date of Patent: Jan. 30, 2001

(54) SLEEVE

(75) Inventors: Setsuo Shouji; Masahiko Tsunemi, both of Tokyo (JP)

(73) Assignee: Seiko Instruments Inc. (JP)

( * ) Notice: Under 35 U.S.C. 154(b), the term of this patent shall be extended for 0 days.

(21) Appl. No.: 09/035,477

(22) Filed: Mar. 5, 1998

(30) Foreign Application Priority Data

Mar. 16, 1997 (JP) .................................................. 9-052147

(51) Int. Cl.⁷ ..................................................... G02B 6/38
(52) U.S. Cl. ................................ 385/70; 385/53; 385/55; 385/72
(58) Field of Search ................................ 385/53, 55, 70, 385/72

(56) References Cited

U.S. PATENT DOCUMENTS

| | | | |
|---|---|---|---|
| 4,134,641 | * | 1/1979 | Kao et al. ........................... 350/96.21 |
| 4,193,665 | * | 3/1980 | Arnold ............................... 350/96.22 |
| 5,239,603 | * | 8/1993 | Sonoda et al. ........................ 385/70 |

FOREIGN PATENT DOCUMENTS

| | | |
|---|---|---|
| 196 29 510 | 1/1997 | (DE) . |
| 185413A1 | 6/1986 | (EP) . |
| 543094A1 | 5/1993 | (EP) . |

OTHER PUBLICATIONS

Patent Abstracts of Japan, vol. 013, No. 215 (P–874) May 19, 1989.
Patent Abstracts of Japan, vol. 008, No. 141 (P–283) Jun. 30, 1984.

* cited by examiner

*Primary Examiner*—Hemang Sanghavi
*Assistant Examiner*—Benjamin Cushwa
(74) *Attorney, Agent, or Firm*—Adams & Wilks

(57) ABSTRACT

A sleeve for connecting ferrules supporting optical fibers has a tubular body having a first end surface, a second end surface opposite the first end surface, an inner peripheral surface, and an outer peripheral surface. Convex projections are disposed on the inner peripheral surface of the tubular body and extend continuously from the first end surface to the second end surface of the tubular body.

1 Claim, 4 Drawing Sheets

SLEEVE

BACKGROUND OF THE INVENTION

This invention relates to a sleeve for connecting between ferrules to hold, for example, an optical fiber.

Conventionally, split sleeves as shown in FIG. 4 have generally being used to photo-couple to one another to each other, in a simple manner, ferrules for holding an optical fiber. As shown in FIG. 4, the conventional split sleeve 100 is formed with one strip of a penetrating groove 102 in an axial direction of the cylindrical member 101, which is made of ceramics such as zirconia and usually formed by sintering a cylindrical member, then lapping an inner surface, and then forming a slit by grinding. There has also been used a split sleeve 200 as shown in FIG. 5 that has a plurality of axially-extending concave portions 202 that are spaced at such an interval as to be in parallel with each other on an inner peripheral surface 201a of the cylindrical member 201 to have one strip penetrating groove 203 formed in the axial direction.

With the shape having the one strip penetrating groove provided in the cylindrical member as shown in FIG. 4, however, the inner peripheral surface is usually formed in a surface without roughening. Accordingly, it becomes difficult to maintain the position in which the ferrule is held constant, and the inner diameter dimension tends to deviate. Therefore, there is a problem that the center of the ferrule may somewhat deviate thereby degrading alignment stability. For example, when the sleeve is used to connect ferrules holding an optical fiber, the coupling loss becomes large. Also, the split sleeve as described above tends to be affected by dusts or ground powders, raising a problem of instability in withdrawal force/coupling loss.

Under such circumstances, a split sleeve as shown in FIG. 5 has been used which has the concave portions 202 provided on the inner peripheral surface of the cylindrical member. However, the split sleeve shown in FIG. 5 has to hold a ferrule in a line so that there are disadvantages of high friction and dust occurence. Also, the contact surface between the ferrule and the cylindrical member is small so that the ferrule tends to be removed off, thus keeping the coupling state insufficient.

The present invention has been made to overcome the foregoing drawbacks in the conventional art. It is the object of the present invention to provide a sleeve which is excellent in alignment stability and capable of positively supporting a ferrule with less dust occurrence. Another object of the present invention is to provide a manufacturing method for the sleeve.

SUMMARY OF THE INVENTION

A first form of the present invention lies in a sleeve adapted for fitting rod members therein from respective sides to thereby place the rod members at their tip surfaces in abutment against each other, characterized in that: the sleeve is generally in a cylindrical form to have at least three convex projections or strips provided on an inner peripheral surface that continuously and helically extend at an equal interval from one end to the other end of the sleeve.

This can increase the holding force in a ferrule-withdrawal direction to thereby improve alignment stability.

Here, the sleeve may have at least one strip of an axially extending penetrating groove.

A second form of the present invention lies in a sleeve adapted for fitting rod members therein from respective sides to thereby place the rod members at their tip surfaces in abutment against each other, characterized in that: the sleeve is generally in a cylindrical form to have at least three convex strips provided in an inner peripheral surface that project in a direction inclined from a radial direction to a predetermined circumferential direction so as to extend continuously and at an equal interval from one end to the other end of the sleeve.

This enables the convex strip to be elastically deformable by a slight amount in a radial direction so that the ferrule can be given with an urging force and positively held due to the radial elastic deformation.

Here, the convex strip may be provided to helically extend between the ends of the sleeve.

Also, the sleeve may have at least one strip of a penetrating groove extending in an axial direction.

BRIEF DESCRIPTION OF THE DRAWINGS

FIGS. 1A and 1B are views of a sleeve according to one embodiment of the present invention, wherein FIG. 1A is a perspective view and FIG. 1B is a sectional view.

FIGS. 2A and 2B are views of a sleeve according to another embodiment of the present invention, wherein FIG. 2A is a perspective view and FIG. 2B is a side view.

DETAILED DESCRIPTION OF THE PREFERRED EMBODIMENTS

Explanations will be made hereinbelow on embodiments of the present invention with reference to the drawings.
(Embodiment 1)

Figure 1A:
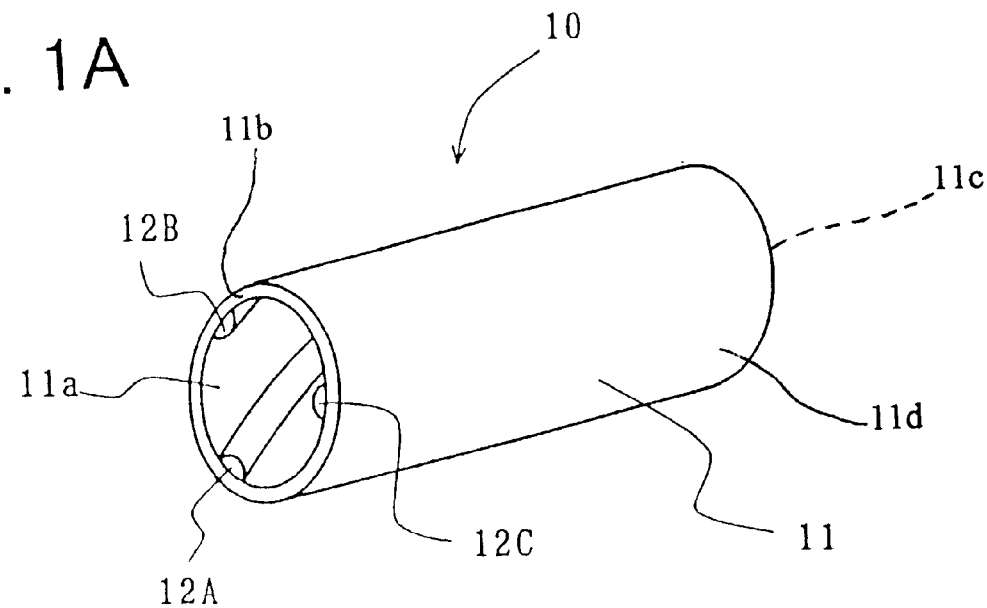
Figure 1B:
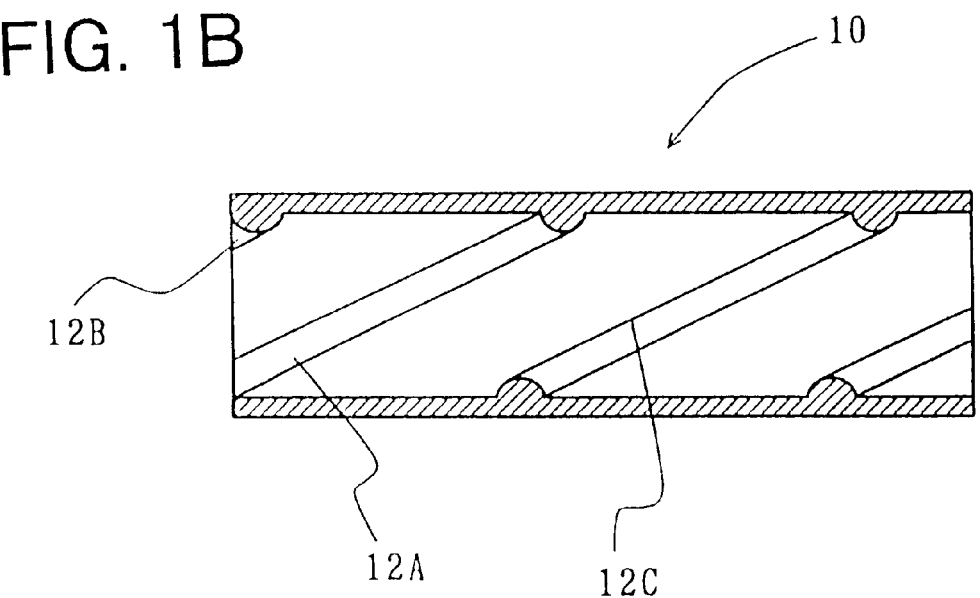

FIG. 1 is a perspective view of a sleeve according to a present embodiment.

As shown in FIG. 1, the sleeve 10 of the present embodiment comprises a generally cylindrical tubular body or member 11 having a first end surface 11b, a second end surface 11c, an inner peripheral surface 11a, an outer peripheral surface 11d, and projections three convex projections or strips 12A, 12B and 12C (hereinafter represented by 12) provided on the inner peripheral surface 11a so as to helically and continuously extend at an equal interval from one end to the other end of the generally cylindrical member 11. These convex strips 12 are sectionally in an arcuate form so that these arcuate convex strips 12 holds a ferrule in linear contact therewith in a manner surrounding an outer periphery of the ferrule.

The sleeve 10 employs for example, as a material, yttria-added partially-stabilized zirconia ($ZrO_2 \cdot Y_2O_3$ ($Y_2O_3$: contained 3% by mol), which is formed by heating, for example, at 150° C. and further sintering at a high temperature of approximately 1500° C.

The sleeve 10 has an increased holding force in a ferrule-removal direction by helically providing the convex strips, as compared to the one provided with convex strips in parallel with the afore-said axis, making possible to improve alignment stability. Also, since the ferrule is held in linear contact, it is possible to reduce the occurrence of dusts and decrease the coupling loss.

Incidentally, the sleeve of the present embodiment having the convex strips 12 can be manufactured by forming during the formation and sintering.

(Embodiment 2)

Figure 2A:
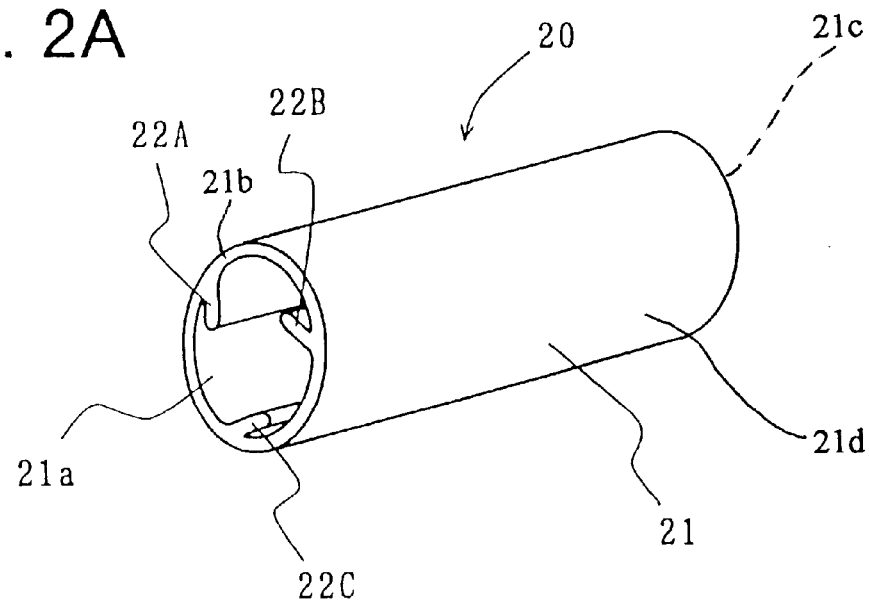
Figure 2B:
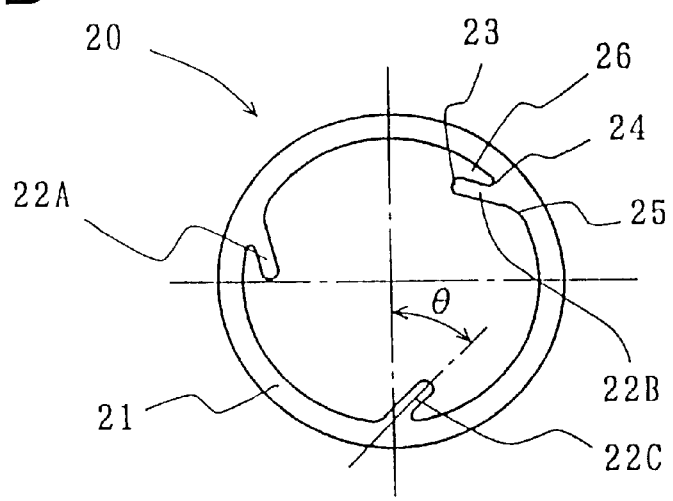

FIG. 2A is a perspective view of a sleeve according to a second embodiment, while FIG. 2B is a side view of a sleeve of the second embodiment. As shown in FIG. 2A and FIG. 2B, the sleeve 20 of this embodiment comprises a generally cylindrical tubular body or member 21 having a first end surface 21b, a second end surface 21c, an inner peripheral surface 21a, an outer peripheral surface 21d, and three convex projections or strips 22A, 22B and 22C (hereinafter represented by 22) provided projecting at a predetermined inclined angle θ from a radial direction to a predetermined circumferential direction on the inner peripheral surface 21a so as to extend continuously and at an equal interval from one end to the other end of the generally cylindrical member 21. Each convex strip 22 has a convex tip portion 23 having a radius R, and connecting portions 24 and 25 connecting the convex strip 22 to the inner peripheral surface 21a of the generally cylindrical member 21 and having respective radiuses R. These convex strips 22 and the inner peripheral surface 21a have a space 26 existing therebetween so that the convex strips are somewhat elastically deformable in the radial direction.

According to the sleeve of the present embodiment, although the ferrule can be held in linear contact in a line form, it is positively supported because an urging force due to radial deformation of the convex strip is available. Also, the convex strip 22 of the present embodiment may be helically provided similarly to the embodiment 1. This can increase the holding strength in a ferrule-withdrawal direction.

(Embodiment 3)

Further, each sleeve of the above-stated embodiments may have a penetrating groove ex tending in the axial direction. FIG. 3 shows one example of a split sleeve of a present embodiment.

Figure 3A:
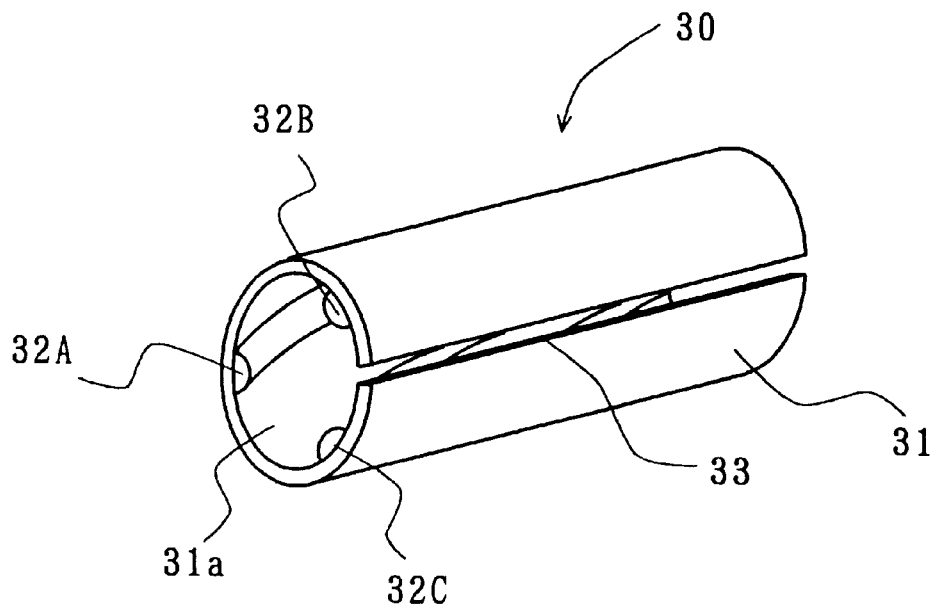
FIGS. 3A and 3B are perspective views of a split sleeve according to the present embodiment.

As shown in FIG. 3A, the split sleeve 30 is the same as the sleeve 10 of the embodiment 1 except for having a longitudinal slot or penetrating groove 33 extending in the axial direction in the generally cylindrical member 31, so that it has convex strips 32A–32C on the inner peripheral surface 31a.

Figure 3B:
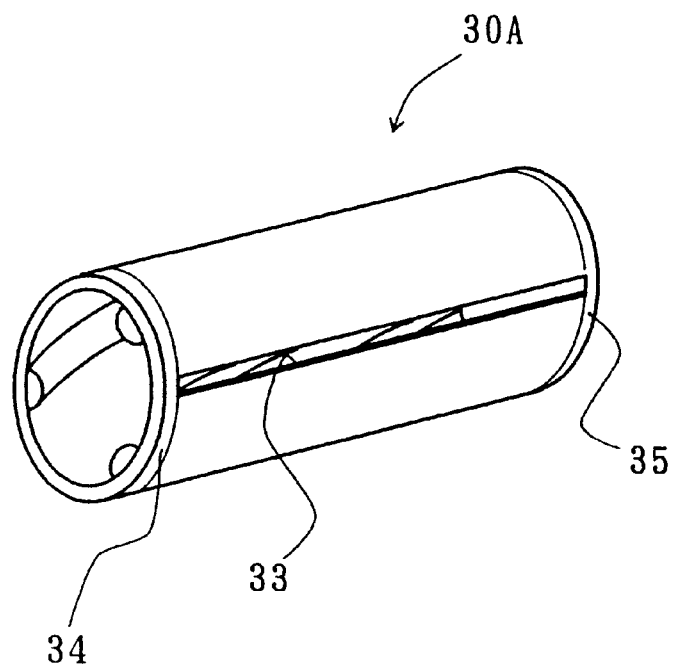
Figure 4:
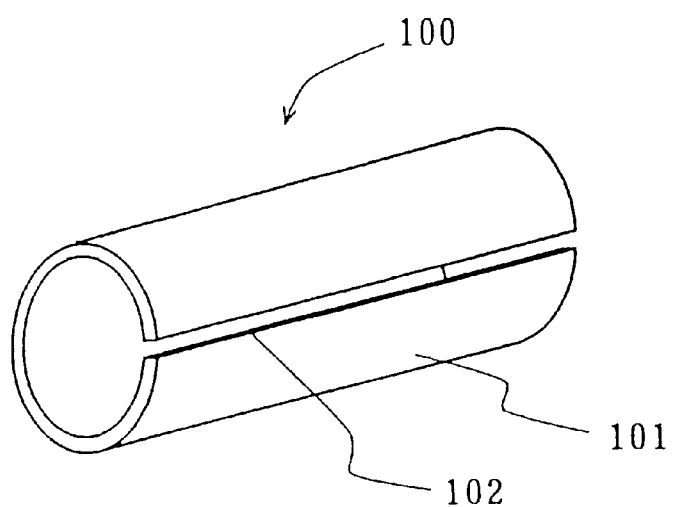
FIG. 4 is a perspective view showing one example of a conventional split sleeve.
Figure 5:
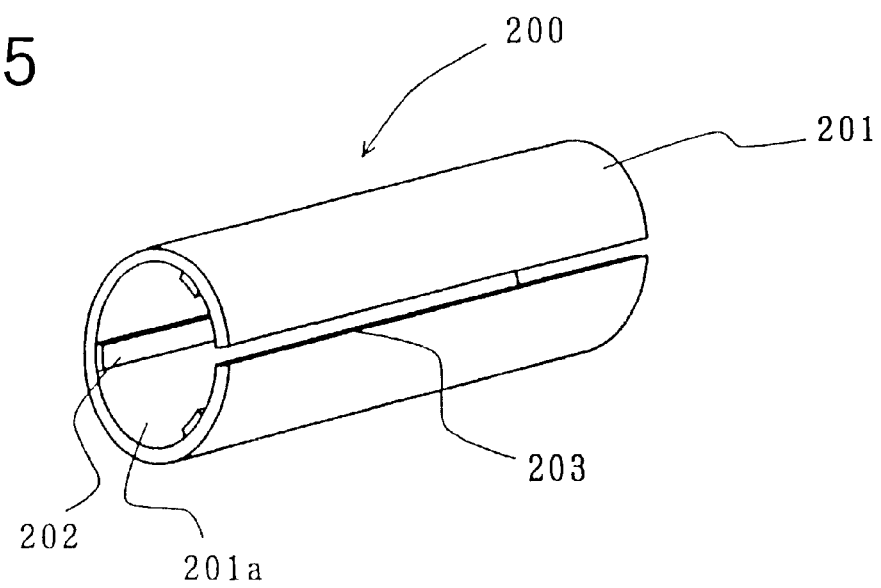
FIG. 5 is a perspective view showing another example of a conventional split sleeve.

This split sleeve 30 is formed from a split sleeve material 30A shown in FIG. 3B. The split sleeve material 30A shown in FIG. 3B has, at respective ends, annular end portions 34 and 35 at which no penetrating groove 33 is formed. This split sleeve material 30A is formed into a split sleeve 30 as shown FIG. 3A, by cutting the annular end portions at the respective ends to open the both ends of the penetrating groove 33.

This split sleeve 30 is very easy to manufacture because the penetrating groove is formed in a different manufacturing method from the conventional.

Incidentally, the shape of the penetrating groove is not limited to the above. For example, a plurality strips of penetrating grooves may be provided that do not continue up to the respective end portions.

As explained above, according to the present invention, the ferrule can be held more positively by providing the convex strips helically or elastically deformably on the inner peripheral surface of the generally cylindrical member. Also, the convex strips and the ferrule are in linear contact so that occurrence of dusts can be reduced to a remarkable extent.

What is claimed is:

1. A sleeve for connecting two rod members in end to end relation comprising: a tubular body having a first end surface, a second end surface opposite the first end surface, an inner peripheral surface, an outer peripheral surface, and a longitudinal slot penetrating through the outer and inner peripheral surfaces and extending between but not extending to the first and second end surfaces; and a plurality of convex projections disposed on the inner peripheral surface of the tubular body and extending continuously from the first end surface to the second end surface of the tubular body.

* * * * *